(12) United States Patent
Karlsson et al.

(10) Patent No.: US 11,911,823 B2
(45) Date of Patent: Feb. 27, 2024

(54) RAKE ARM ASSEMBLIES

(71) Applicant: GENERAL ELECTRIC COMPANY, Schenectady, NY (US)

(72) Inventors: Peter Karlsson, Molnlycke (SE); Lars Löwgren, Molnlycke (SE); Karl Hansson, Molnlycke (SE)

(73) Assignee: General Electric Company, Schenectady, NY (US)

( * ) Notice: Subject to any disclaimer, the term of this patent is extended or adjusted under 35 U.S.C. 154(b) by 64 days.

(21) Appl. No.: 17/501,139

(22) Filed: Oct. 14, 2021

(65) Prior Publication Data

US 2022/0134443 A1 May 5, 2022

Related U.S. Application Data

(60) Provisional application No. 63/107,607, filed on Oct. 30, 2020.

(51) Int. Cl.
*B22F 12/67* (2021.01)
*B22F 12/00* (2021.01)
(Continued)

(52) U.S. Cl.
CPC ............ *B22F 12/67* (2021.01); *B22F 12/224* (2021.01); *B29C 64/236* (2017.08); *B33Y 30/00* (2014.12); *B22F 10/28* (2021.01)

(58) Field of Classification Search
CPC .......... B22F 12/50; B22F 12/60; B22F 12/63; B22F 12/67; B22F 12/22; B22F 12/224;
(Continued)

(56) References Cited

U.S. PATENT DOCUMENTS 5,252,264 A * 10/1993 Forderhase ........... B22F 12/224
156/272.8
6,939,045 B1 * 9/2005 Shing-Neng ........ F16C 29/0647
384/45
(Continued)

FOREIGN PATENT DOCUMENTS

CN 107297898 A 10/2017
CN 107486557 * 12/2017
(Continued)

OTHER PUBLICATIONS

Espacenet translation of Yang et al., CN 107486557, originally published 2017 (Year: 2017).*
(Continued)

*Primary Examiner* — Seyed Masoud Malekzadeh
*Assistant Examiner* — Jennifer L Groux
(74) *Attorney, Agent, or Firm* — Dinsmore & Shohl LLP

(57) ABSTRACT

A rake arm assembly mountable to a build table having an upper surface and an opposite lower surface is provided. The rake arm assembly includes a rake arm body extending in a direction transverse to a working axis and positionable at the upper surface of the build table, a first guide rail mountable to the lower surface of the build table and extending along the working axis, a first rake support member fixed to a first end of the rake arm body and movably supported on the first guide rail, a second rake support member fixed to an opposite second end of the rake arm body, and a guide pad fixed to a lower surface of the second rake support member and positionable at the lower surface of the build table.

13 Claims, 9 Drawing Sheets

(51) Int. Cl.
*B29C 64/236* (2017.01)
*B33Y 30/00* (2015.01)
*B22F 10/28* (2021.01)

(58) Field of Classification Search
CPC ... B29C 64/205; B29C 64/214; B29C 64/218; B29C 64/227; B29C 64/236; B05C 11/02; B05C 11/028; B05C 11/04; B05C 11/041; B05C 11/042; B05C 11/044; B05C 11/048; B05C 19/04
See application file for complete search history.

(56) References Cited

U.S. PATENT DOCUMENTS

| | | | |
|---|---|---|---|
| 2016/0144429 A1 | 5/2016 | Mizutani | |
| 2018/0154480 A1* | 6/2018 | Bai | B33Y 50/02 |
| 2021/0069975 A1* | 3/2021 | Kitamura | B29C 64/205 |
| 2021/0331376 A1* | 10/2021 | Preston | B29C 64/118 |

FOREIGN PATENT DOCUMENTS

| | | | |
|---|---|---|---|
| CN | 107486557 A * | 12/2017 | |
| EP | 3789136 A1 | 3/2021 | |
| JP | 2015020328 A * | 2/2015 | |
| WO | 2018227229 A1 | 12/2018 | |
| WO | WO-2021175737 A1 * | 9/2021 | B05C 11/04 |

OTHER PUBLICATIONS

Extended European Search Report for EP Application No. 21203104.1 dated Mar. 29, 2022 (12 pages).

\* cited by examiner

RAKE ARM ASSEMBLIES

CROSS-REFERENCE TO RELATED APPLICATION

This application claims priority to U.S. Provisional Patent Application No. 63/107,607, filed Oct. 30, 2020, for "Rake Arm Assemblies," which is hereby incorporated by reference in its entirety including the drawings.

TECHNICAL FIELD

The present specification generally relates to powder dispersion apparatuses for dispersing powder and, more specifically, to additive manufacturing systems including powder dispersion apparatuses for dispersing powder on a build table.

BACKGROUND

Conventional additive manufacturing systems deposit individual layers of metal powder onto a build platform for processing by electron beams. The electron beams emit high heat radiation at the deposited powder to fuse the powder together, thereby forming individual cross-sections of a three-dimensional object. The process is repeated for each individual cross-section of the object until the object is completely formed. However, methods for depositing powder onto the build platform may not be uniform, which results in inconsistent cross-section thicknesses and fusing abnormalities. Thus, spreading devices, typically formed from metal, may be provided for passing over the build platform to spread the powder into flat, even layers after each deposition of powder and prior to fusing the layer of powder by the electron beams.

During operation, the electron beams contacting the metal powder result in extreme temperatures (e.g., rapid heating and/or cooling within an enclosed build chamber). These changes in temperature may cause the metal spreading devices to expand or contract. Since the ends of the spreading devices may be axially fixed to the additive manufacturing system, any expansion results in warping or bowing of the spreading device. Warping or bowing prevents the spreading device from consistently spreading powder.

SUMMARY

In one embodiment, a rake arm assembly mountable to a build table having an upper surface and an opposite lower surface includes a rake arm body having a first end and a second end. The rake arm body extends in a direction transverse to a working axis and positionable at the upper surface of the build table. A first guide rail is mountable to the lower surface of the build table and extends along the working axis. A first rake support member is fixed to the first end of the rake arm body and movably supported on the first guide rail. A second rake support member is fixed to the second end of the rake arm body. A guide pad is fixed to a lower surface of the second rake support member and positionable at the lower surface of the build table.

In another embodiment, an additive manufacturing system includes a build table having an upper surface and an opposite lower surface, and a rake arm assembly. The rake arm assembly includes a rake arm body having a first end and a second end. The rake arm body extends in a direction transverse to a working axis and is positioned at the upper surface of the build table. A first guide rail extends along the working axis and is fixed to the lower surface of the build table. A first rake support member is fixed to the first end of the rake arm body and movably supported on the first guide rail. A second guide rail extends along the working axis and is fixed to the lower surface of the build table. A second rake support member is fixed to the second end of the rake arm body. A guide pad is fixed to a lower surface of the second rake support member and movably supported on an upper surface of the second guide rail. The guide pad is positioned at the lower surface of the build table opposite the rake arm body.

In yet another embodiment, a rake arm assembly mountable to an additive manufacturing system having a build table that has an upper surface and an opposite lower surface is provided. The rake arm assembly includes a rake arm body having a first end and a second end. The rake arm body extends in a direction transverse to a working axis and is positioned at the upper surface of the build table. A first rake support member is fixed to the first end of the rake arm body. A second rake support member is fixed to the second end of the rake arm body. A guide rail extends along the working axis and is mountable to the lower surface of the build table. A guide pad is fixed to a lower surface of the second rake support member and movably supported on an upper surface of the guide rail. The guide pad is positioned at the lower surface of the build table.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
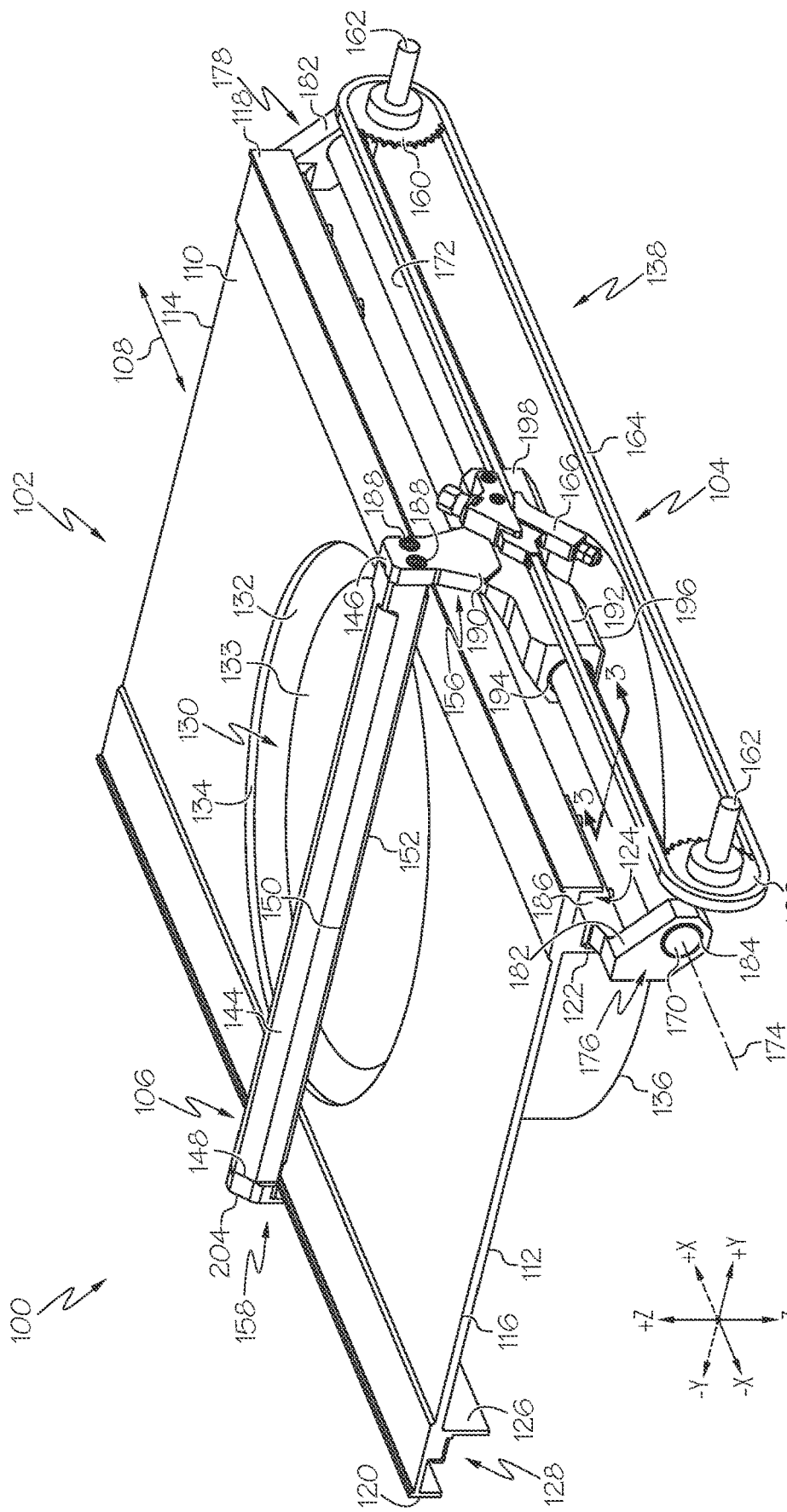
FIG. 1 schematically depicts a perspective view of an embodiment of a rake arm assembly positioned adjacent to a build table of an additive manufacturing system according to one or more embodiments shown and described herein.

Embodiments described herein are directed to rake arm assemblies for spreading metal powder across a build platform. The rake arm assemblies described herein generally include a rake arm having a rake arm body, a first rake support member fixed to a first end of the rake arm body, and a second rake support member fixed to an opposite second end of the rake arm body. The first rake support member engages a first guide rail positioned on a first side of a build table, and the second rake support member engages a second guide rail positioned on an opposite second side of the build table. The second rake support member is configured to maintain engagement with the second guide rail during expansion of the rake arm due to high temperature conditions that may be experienced during a build process (e.g., heat generated by electron beams fusing metal powder).

In embodiments, the powder may be spread by the rake arm assembly, particularly the rake arm body, according to particular build specifications. The build specifications may include providing an even layer, such that an upper surface of the powder is a flat, horizontal surface, or an uneven layer, such that the upper surface of the powder has a non-planar contour or geometry defined by a contour of the rake arm body contacting the powder.

Various embodiments of the rake arm assemblies, additive manufacturing systems including the same, and operation thereof are described in more detail herein. Whenever possible, the same reference numerals will be used throughout the drawings to refer to the same or like parts.

As used herein, "upper" and "above" are defined as the +Z direction of the coordinate axes shown in the drawings. "Lower" and "below" are defined as the −Z direction of the coordinate axes shown in the drawings.

While the present disclosure describes rake arms used in additive manufacturing systems, it is to be understood that this is just one illustrative embodiment and the present disclosure is not limited to rake arms in additive manufacturing systems. For example, rake arms described herein may be utilized in other systems for spreading or otherwise distributing a powder or any suitable material.

Referring now to FIG. 1, a partial view of an additive manufacturing system 100 is illustrated according to one or more embodiments described herein. The additive manufacturing system 100 may generally include a build table 102 and a rake arm assembly 104 including a rake arm 106 movable along a working axis 108, i.e., the +/−X axis of the coordinate axes depicted in the drawings, as described in more detail herein. The build table 102 includes an upper surface 110, an opposite lower surface 112, a first end 114, an opposite second end 116, a first outer side wall 118 and a second outer side wall 120 extending between the first end 114 and the second end 116 and in a direction opposite the lower surface 112 of the build table 102. In embodiments, the build table 102 includes a first inner side wall 122 extending from the lower surface 112 of the build table 102 proximate the first outer side wall 118 and defines a first channel 124 formed therebetween. Similarly, in embodiments, the build table 102 includes a second inner side wall 126 extending from the lower surface 112 of the build table 102 proximate the second outer side wall 120 and defines a second channel 128 formed therebetween.

An opening 130 is formed in the build table 102, which defines a build envelope 132. The build envelope 132 has an open top end 134 and an opposite bottom end 136. In embodiments, the build envelope 132 and the build table 102 may be a one piece, monolithic structure. The additive manufacturing system 100 includes a build platform 133 movably positioned within the build envelope 132. The build platform 133 is shown slightly below the top end 134 of the build envelope 132. Although not shown, it should be appreciated that the build platform 133 is coupled to a moving device for moving the build platform 133 between the top end 134 and the bottom end 136 of the build envelope 132 to adjust a size, i.e., a height, of a build area above the build platform 133 in which powder is deposited. The moving device for lowering the build platform 133 may be, for example, a piston actuatable by an electric motor, a pneumatic motor, a hydraulic motor, and the like. In embodiments, the build platform 133 remains stationary in a fixed vertical position. As such, a moving device may be provided for moving the build table 102 and the rake arm assembly 104 mounted thereto vertically and relative to the build platform 133. Thus, the build area in which powder is deposited above the build platform 133 may be adjusted without moving the build platform 133 itself.

The additive manufacturing system 100 also includes a powder hopper, not shown, for providing or otherwise directing powder onto the build platform 133 within the build envelope 132. The powder material may be, for example, pure metals or metal alloys such as titanium, titanium alloys, aluminum, aluminum alloys, stainless steel, CoCr alloys, nickel based superalloys, and the like. As described herein, the rake arm 106 assembly passes over the build envelope 132, specifically the build platform 133, to disperse or spread the deposited powder and create a flat, smooth layer of powder prior to performing a fusing operation.

The term "electron beam" as used herein in various embodiments refers to any charged particle beam. The sources of charged particle beam can include an electron gun, a linear accelerator, and so on. Instead of using an electron beam, a laser beam may be used for fusing the powder deposited onto the build platform 133. The additive manufacturing system 100 includes an electron beam gun, not shown, generating an electron beam used for melting or fusing together powder provided on the build platform 133. The electron beam may be directed over the build platform 133 causing a first powder layer to fuse in selected locations to form a first cross section of a three-dimensional article. The electron beam is directed over the build platform 133 based on instructions provided by a control unit. The control unit stores instructions for how to control the electron beam for each layer of the three-dimensional article.

During a work cycle, the build platform 133 will be successively lowered within the build envelope 132 after each pass of the rake arm 106 across the build platform 133 and fusing by the electron beam. As such, the build platform 133 starts in an initial position, in which the first powder material layer of necessary thickness has been provided by the powder hopper. After the first layer is subjected to the electron beam, i.e., the fusion of powder material for making a first layer of the three-dimensional article, a second powder layer is provided by the powder hopper onto the build platform 133. The second powder layer is typically distributed according to the same manner as the previous layer. However, there might be alternative and/or additional methods in the same additive manufacturing system 100 for distributing powder onto the build table 102. Thereafter, the energy beam is directed over the build table 102 causing the second powder layer to fuse in selected locations to form a second cross section of the three-dimensional article. Fused portions in the second layer may be bonded to fused portions of the first layer. The fused portions in the first and second layer may be melted together by melting not only the powder in the uppermost layer, but also remelting at least a fraction of a thickness of a layer directly below the uppermost layer.

Due to the fusing of the powder layers by the electron beams, the additive manufacturing system 100 may be subjected to high temperatures (up to about 1,000° C.). Embodiments are described herein which permit the rake arm assembly 104 to expand or contract without affecting the surface quality of the powder layer on the build platform 133. Specifically, as discussed in more detail herein, the heat caused by the electron beams when the powder is fused may cause the rake arm 106 of the rake arm assembly 104 to expand, for example, in the −Y direction of the coordinate axes depicted in the drawings, and subsequently contract, for example, in the +Y direction, when the temperature surrounding the rake arm assembly 104 cools down. However, expansion and contraction may occur in any other direction.

Figure 2:
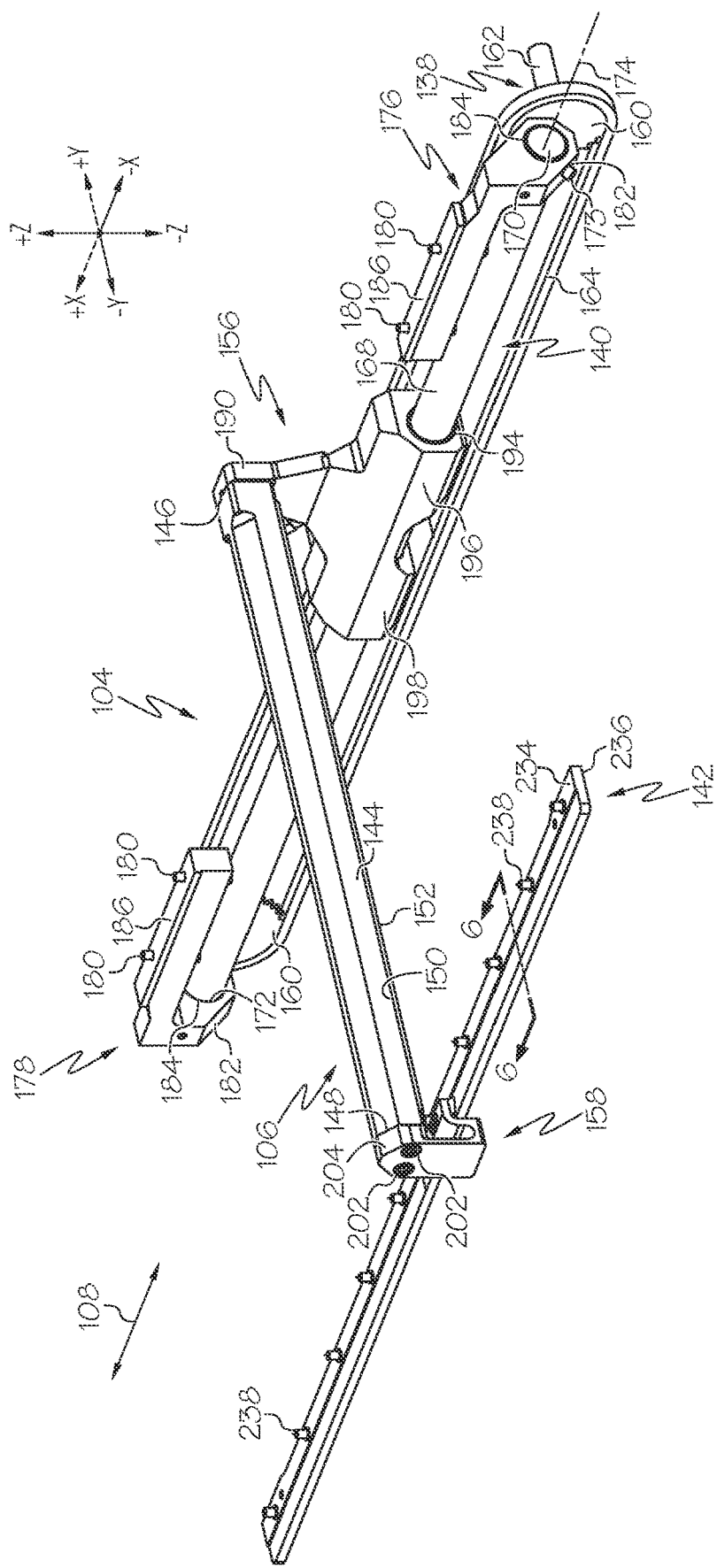
FIG. 2 schematically depicts another perspective view of the rake arm assembly of FIG. 1 without the build table according to one or more embodiments shown and described herein.
Figure 3:
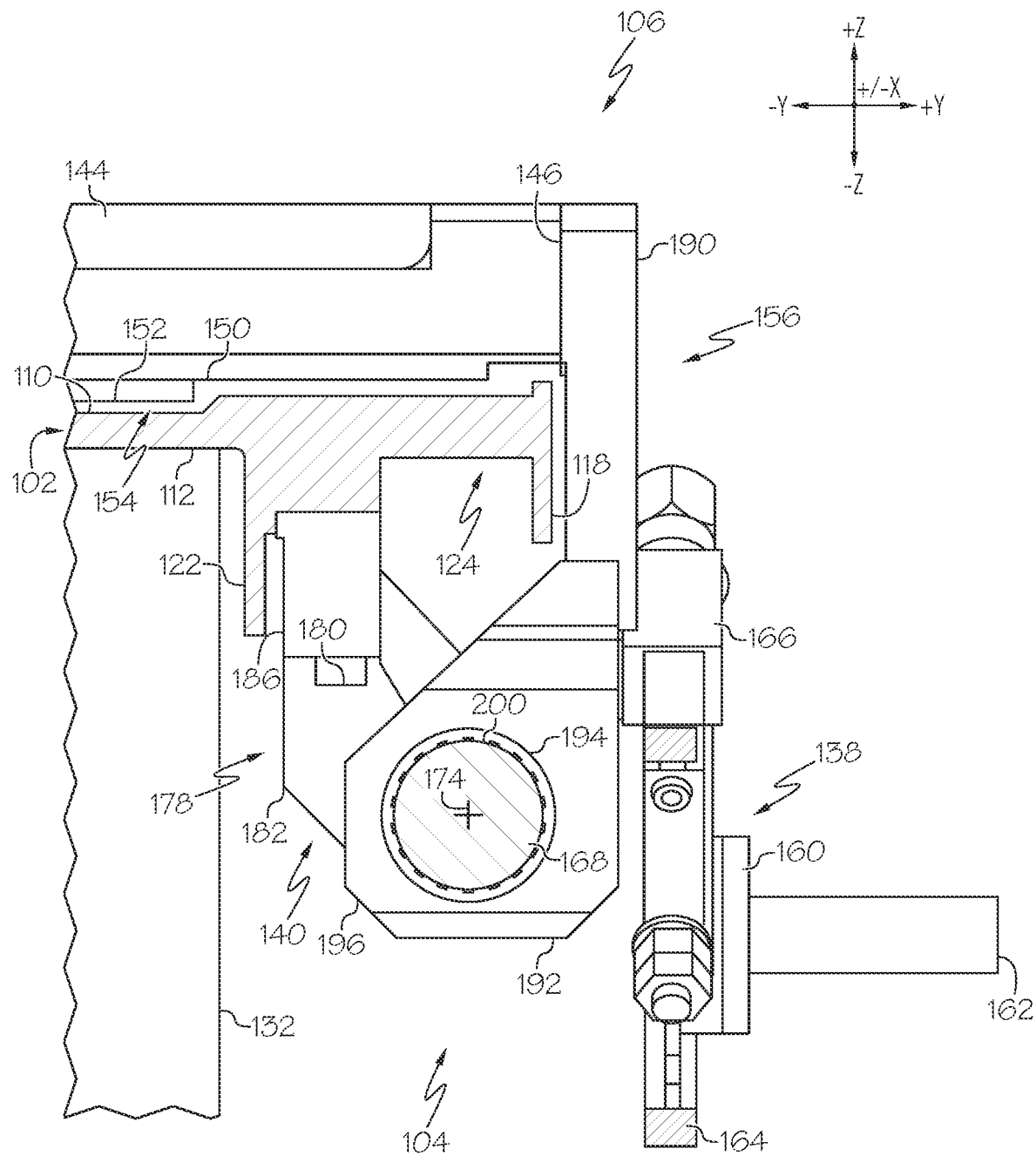
FIG. 3 schematically depicts a partial cross-sectional view of the rake arm assembly of FIG. 1 taken along line 3-3 of FIG. 1 according to one or more embodiments shown and described herein.

Referring now to FIGS. 1 and 2, in embodiments, the rake arm assembly 104 generally includes the rake arm 106, a drive assembly 138, a first guide rail 140, and a second guide rail 142. The rake arm 106 includes a rake arm body 144 having a first end 146 and an opposite second end 148. The rake arm body 144 has a lower surface 150 extending in a direction transverse to the working axis 108. However, in embodiments, the rake arm body 144 may extend across the build table 102 at a non-perpendicular angle relative to the working axis 108. The lower surface 150 of the rake arm body 144 may be a planar member such that the lower surface 150 of the rake arm body 144 extends parallel to the upper surface 110 of the build table 102 when positioned thereon. In embodiments, the rake arm body 144 includes a blade 152 defining the lower surface 150 of the rake arm body 144 or extending therefrom and in the −Z direction of the coordinate axes depicted in the drawings, i.e., toward the build table 102. The rake arm body 144 is positioned above the build table 102 and spaced apart therefrom to provide a gap 154, as shown in FIG. 3, between the blade 152 and the upper surface 110 of the build table 102. Thus, during operation of the rake arm assembly 104, i.e., as the rake arm body 144 moves across the build table 102 along the working axis 108, the blade 152 of the rake arm body 144 pushes any excess powder accumulating above the gap 154 defined between the upper surface 110 of the build table 102 and the blade 152 away from the build envelope 132. As described in more detail herein, the rake arm 106 also includes a first rake support member 156 coupled to the first end 146 of the rake arm body 144, and a second rake support member 158 coupled to the second end 148 of the rake arm body 144 for supporting the first end 146 and the second end 148 of the rake arm body 144, respectively, above the build table 102.

The drive assembly 138 of the rake arm assembly 104 includes any suitable device for translating the rake arm 106 along the working axis 108. In embodiments, the drive assembly 138 includes a pair of pinions 160 positioned proximate opposite ends 114, 116 of the build table 102 and including a shaft 162 rotatably attached to a support structure, not shown. As shown, the pair of pinions 160 are spaced apart from one another at a distance substantially equal to a distance between the first end 114 and the second end 116 of the build table 102 to permit the rake arm body 144 to translate across substantially an entire portion of the build table 102. However, in embodiments, the distance between the pair of pinions 160 may be greater or less than that illustrated in FIG. 1 based on a size of the build table 102 and/or a size of the build envelope 132. In embodiments, the drive assembly 138 also includes a drive chain 164 engaging the pair of pinions 160 and extending along the working axis 108. A mounting device 166 may be fixed on the drive chain 164 for coupling the drive assembly 138 to the rake arm 106, such as the first rake support member 156. However, it should be understood that other embodiments of the drive assembly 138 may be provided such as, for example, a rack and pinion gear, linear actuator, and the like instead of the drive chain 164. As such, in embodiments, the drive assembly 138 may include only a single pinion 160.

Referring now to FIGS. 1-3, the first guide rail 140 of the rake arm assembly 104 includes a rail member 168 having a first end 170 and an opposite second end 172. In embodiments, the rail member 168 has a cylindrical geometry and extends along a guide axis 174 parallel to the working axis 108. However, in other embodiments, the rail member 168 may have any suitable geometry such as, for example, rectangular. As shown, the first guide rail 140 includes a first mount 176 fixed to the first end 170 of the rail member 168 and a second mount 178 fixed to the second end 172 of the rail member 168. As shown in FIG. 1, the first mount 176 and the second mount 178 each includes one or more fasteners 180 for attaching each of the first mount 176 and the second mount 178 to the lower surface 112 of the build table 102. More particularly, the first mount 176 and the second mount 178 each includes an extension portion 182 having an opening 184 for receiving a respective end of the rail member 168, and an insertion portion 186 extending from the extension portion 182. The insertion portion 186 of the first mount 176 and the second mount 178 is insertable into the first channel 124 of the build table 102 and secured to the lower surface 112 of the build table 102 by the one or more fasteners 180. As shown in FIG. 2, a pair of fasteners 180 are provided to extend from each insertion portion 186 into the lower surface 112 of the build table 102.

The ends 170, 172 of the rail member 168 extend through the opening 184 formed in a corresponding extension portion 182. In embodiments, only one end 170, 172 is fixed to a corresponding extension portion 182 by any suitable manner, such as welding, using fasteners, or the like, to permit the rail member 168 to move (e.g., expand and/or contract) in the +/−X directions of the coordinate axes of FIGS. 1-3 due to increases and/or decreases in temperature. As shown in FIG. 2, a fastener 173 extends through the extension portion 182 of the first mount 176 and secures the first end 170 of the rail member 168 within the opening 184 formed in the extension portion 182 of the first mount 176. However, the second end 172 of the rail member 168 is not secured and thus is free to move within the opening 184 formed in the extension portion 182 of the second mount 178. Alternatively, the second end 172 of the rail member 168 may be secured to the second mount 178 and the first end 170 of the rail member 168 may be free to move relative to the first mount 176. Further, the rail member 168 has a length defined by a distance between the first end 170 and the second end 172, which is substantially as long as the length of the build table 102 and a distance between the pair of pinions 160. This permits the rake arm body 144, specifically the first end 146 of the rake arm body 144, to be supported during translation of the rake arm body 144 across the entire build table 102. However, in embodiments, the length of the rail member 168 may be greater or less than that illustrated based on the size of the build table 102 and/or the size of the build envelope 132.

Referring still to FIGS. 1-3, the first rake support member 156 of the rake arm 106 is shown coupled to the first end 146 of the rake arm body 144 by one or more fasteners 188, such as screws, bolts, rivets, or the like. The first rake support member 156 includes a coupling member 190 coupled to the first end 146 of the rake arm body 144 by the fasteners 188, and a receiving member 192 extending from the coupling member 190. The receiving member 192 and the coupling member 190 may be a one piece, monolithic structure. The receiving member 192 has a bore 194 formed therein and extending along the +/−X axes of the coordinate axes depicted in the drawings. The bore 194 is coaxially aligned with the guide axis 174 defined by the rail member 168 of the first guide rail 140 such that the rail member 168 extends through the bore 194 formed in the receiving member 192. As shown in FIG. 2, in embodiments, the receiving member 192 includes a first portion 196 extending from the coupling member 190 in the −X direction and is on a first side of the rake arm body 144, and a second portion 198 extending from the coupling member 190 in the +X direction and on an opposite second side of the rake arm body 144. It should be appreciated that the receiving member 192 extending along the +/−X axis provides additional support on the rail member 168 and increased stability preventing the rake arm body 144 from rotating about the +/−Y axes and the +/−Z axes of the coordinate axes depicted in the drawings.

As shown in FIG. 3, the rail member 168 is shown extending through the bore 194 formed in the receiving member 192 and the insertion portion 186 of the second mount 178 is shown extending within the first channel 124 of the build table 102 and mounted to the lower surface 112 of the build table 102 by a fastener 180. Further, the mounting device 166 is shown receiving the drive chain 164 and mounted to an outer surface of the first rake support member 156. Accordingly, rotation of the pinions 160 cause the drive chain 164 to move in the first direction or the second direction and translate the first rake support member 156, and thus the rake arm 106, accordingly. However, it should be appreciated that the drive assembly 138 may be coupled to the rake arm 106 at any suitable location, such as the rake arm body 144.

Figure 4:
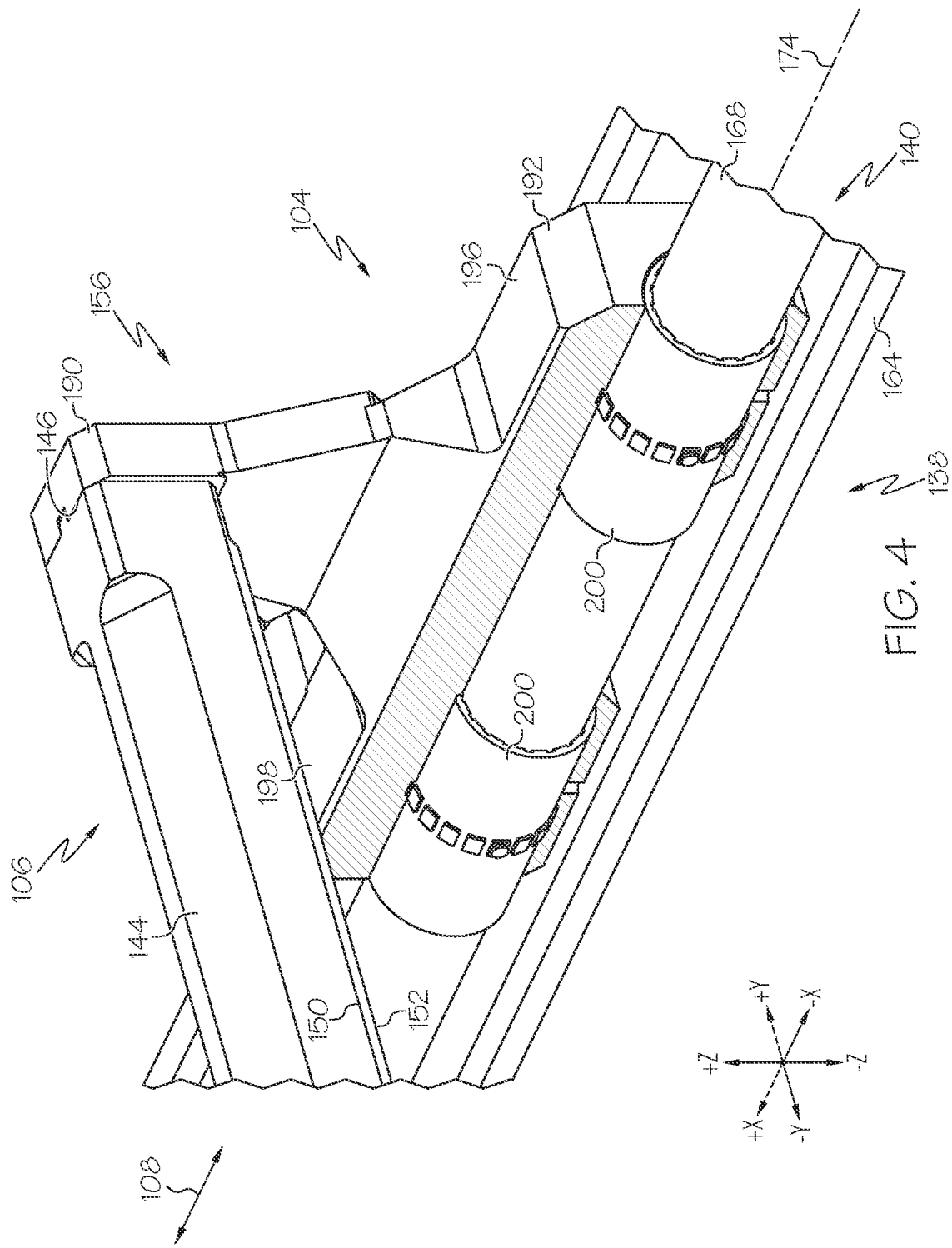
FIG. 4 schematically depicts a partial cross-sectional view of a first rake support member of the rake arm assembly of FIG. 1 according to one or more embodiments shown and described herein.

Referring still to FIG. 3, in embodiments, a bushing 200 is provided within the bore 194 of the receiving member 192 to reduce the amount of friction between the rail member 168 and the receiving member 192 as the first rake support member 156 translates along the rail member 168. As shown in FIG. 4, a partial view of the first rake support member 156 is shown to illustrate the rail member 168 extending through the bushing 200. In embodiments, a single bushing 200 may be provided extending through the entire bore 194 formed in the first rake support member 156, such as through the first portion 196 and the second portion 198 of the receiving member 192. In other embodiments, as shown, a pair of bushings 200 are provided in which one bushing 200 is provided in the bore 194 formed in the first portion 196 of the receiving member 192, and another bushing 200 is provided in the bore 194 formed in the second portion 198 of the receiving member 192. The bushings 200 may be fixed within the respective bores 194 of the first portion 196 and the second portion 198 of the receiving member 192 to slide along the rail member 168 as the receiving member 192 translates along the guide axis 174. In embodiments, the bushing 200 may include a ball bearing or any other suitable friction reduction mechanism for facilitating translation of the receiving member 192 along the rail member 168. In embodiments, the bushing 200 may not be provided and, instead, a friction reduction mechanism such as, for example, ball bearings and the like, may be provided within the bore 194 of the first rake support member 156. In some embodiments, sliding bearings may be used. Illustrative sliding bearings include, but are not limited to, DryLin® linear guides and bearings from igus GmbH (Cologne, Germany). Use of such bearings may add support to the rail member 168 at a medial portion thereof or at any position along the length of the rail member 168. It should be appreciated that use of such bearings may be beneficial for relatively larger build tables 102 and/or build platform 133 and instances in which the rake arm 106 traverses a greater distance.

Figure 5:
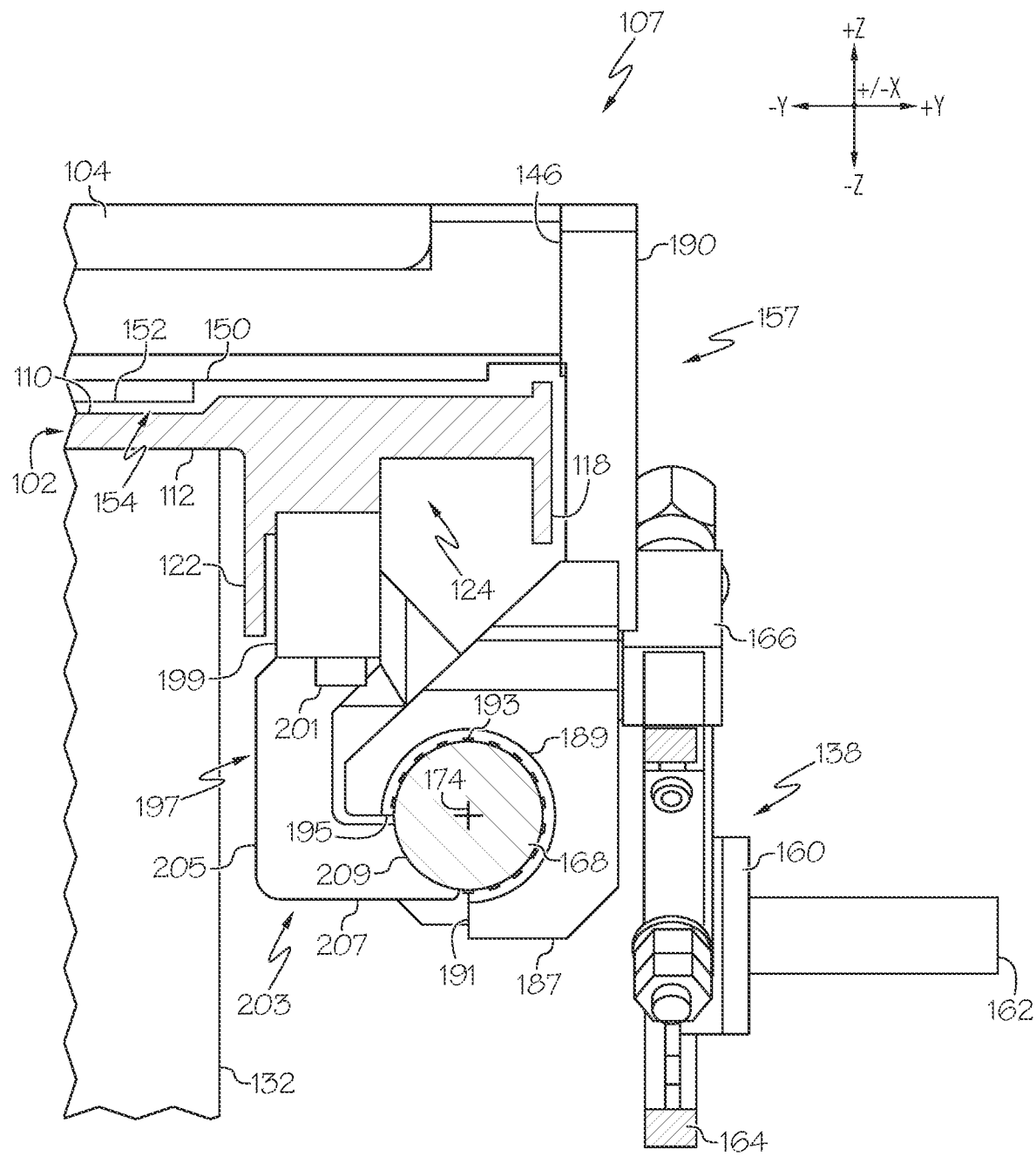
FIG. 5 schematically a partial cross-sectional view of an embodiment of a rake arm assembly according to one or more embodiments shown and described herein.

Referring now to FIG. 5, an embodiment of a rake arm 107 is illustrated similar to the rake arm 106 described herein, except the rake arm 107 includes a first rake support member 157 including a receiving member 187 having a bore 189, similar to the first rake support member 156 of the rake arm 106. However, the receiving member 187 has an access slot 191 formed therein extending along the length, i.e., the +/−X axis, of the rail member 168. As such, all other like members will be referred to herein with like reference numerals. Further, the rake arm 107 includes a friction reduction mechanism, such as a bushing or bearing, referred to herein as a bearing 193, having a C-shaped geometry with an opening 195 corresponding to the access slot 191 formed in the receiving member 187.

To provide additional support to the rail member 168, a support arm 197 is fixed to the lower surface 112 of the build table 102 using a fastener 201 and extends downwardly therefrom. More specifically, the support arm 197 extends from the lower surface 112 of the build table 102 within the first channel 124. The support arm 197 has a mounting portion 199 through which the fastener 201 extends to mount the support arm 197 to the build table 102. The support arm 197 also includes a finger 203 extending from the mounting portion 199. The finger 203 has a substantially L-shaped geometry and, thus, includes a first finger portion 205 extending downwardly from the mounting portion 199, i.e., in the −Z direction, and a second finger portion 207 extending perpendicular from the first finger portion 205 from an end of the first finger portion 205 toward the rail member 168, i.e., in the +Y direction. A distal end 209 of the second finger portion 207 has a concave surface corresponding to the cylindrical geometry of the rail member 168. As such, the second finger portion 207 extends through the access slot 191 formed in the receiving member 187 and the opening 195 formed in the bearing 193 to contact and support the rail member 168. In embodiments, the distal end 209 of the second finger portion 207 may be fixed to the rail member 168 in any suitable manner, such as welding, using fasteners, or the like. In other embodiments, the rail member 168 is freely supported within the concave surface of the distal end 209 of the second finger portion 207 to permit the rail member 168 to move (e.g., expand and/or contract) in the +/−X directions due to increases and/or decreases in temperature.

Figure 6:
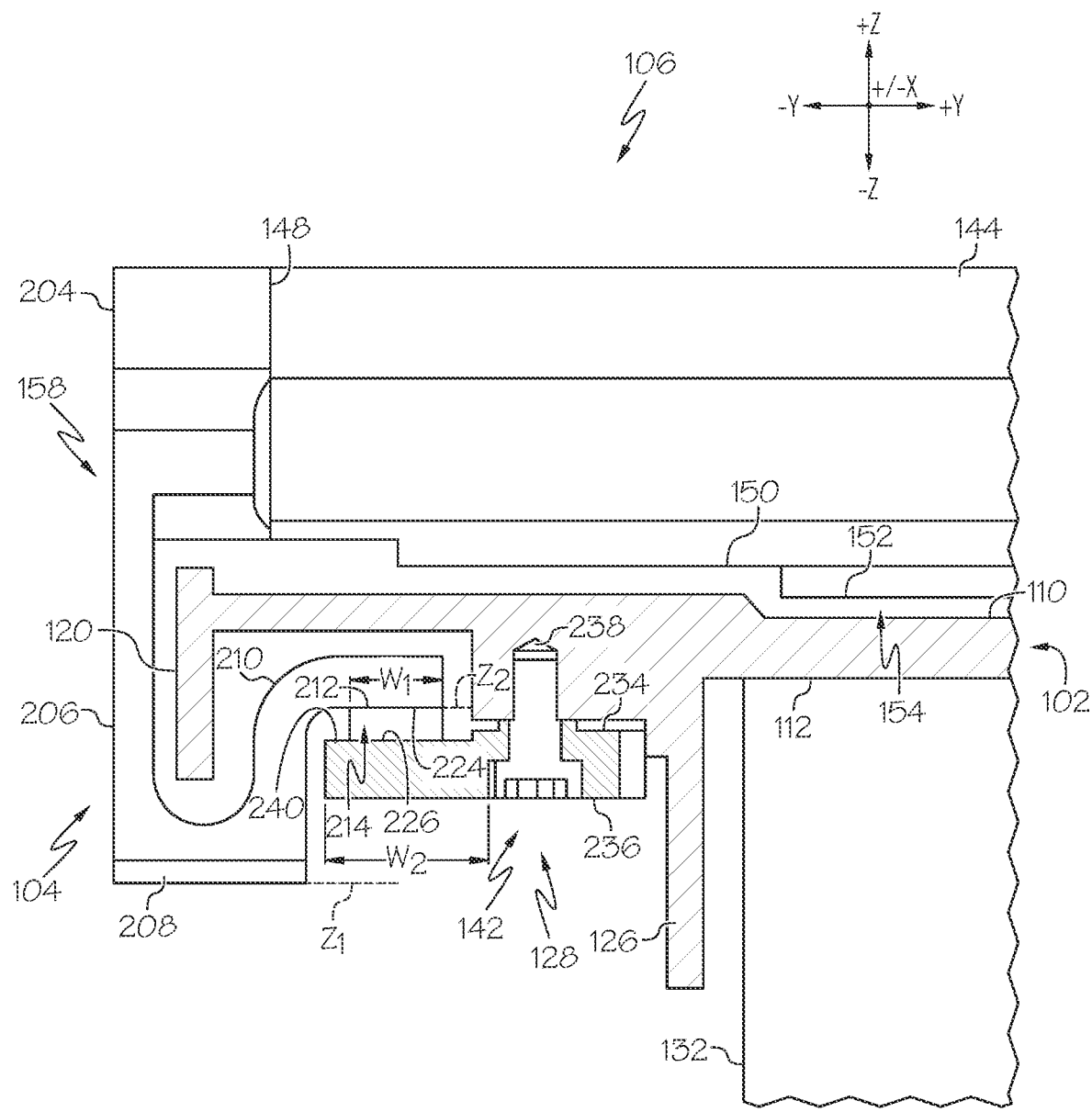
FIG. 6 schematically depicts a partial cross-sectional view of a second guide rail of the rake arm assembly of FIG. 1 taken along line 6-6 of FIG. 2 according to one or more embodiments shown and described herein.

Referring again to the rake arm 106 illustrated in FIG. 2, the second rake support member 158 is illustrated coupled to the second end 148 of the rake arm body 144 by one or more fasteners 202, such as screws, bolts, rivets, or the like. As described in more detail herein, the second rake support member 158 permits the rake arm body 144 to expand due to heat from the electron beams fusing the particles on the build table 102, while maintaining support of the second end 148 of the rake arm body 144. Similarly, the rake arm body 144 may contract due to cooling when temperatures drop after fusing. Referring now to FIG. 6, in embodiments, the second rake support member 158 includes a coupling member 204 coupled to the second end 148 of the rake arm body 144 and a first flange 206 extending from the coupling member 204 and terminating at a distal end 208 opposite the second end 148 of the rake arm body 144. The distal end 208 of the first flange 206 is located at a first vertical position $Z_1$ below the rake arm body 144. The second rake support member 158 further includes a second flange 210 extending from the distal end 208 of the first flange 206 and toward the rake arm body 144. As shown in FIG. 6 with the rake arm 106 positioned on the build table 102, the second flange 210 extends into the second channel 128 of the build table 102 and terminates at a second vertical position $Z_2$ above the first vertical position $Z_1$ of the first flange 206, i.e., in the +Z direction. Thus, the first flange 206 is positioned on a first side of the second outer side wall 120 of the build table 102 and the second flange 210 is positioned on an opposite side of the second outer side wall 120. In embodiments, the coupling member 204, the first flange 206, and the second flange 210 form a one piece, monolithic structure. It should be appreciated that the second flange 210 being positioned within the second channel 128 and below the build table 102 allows the build table 102 to shield the second flange 210 from increased temperatures resulting from the energy beams fusing the powder. Thus, the second flange 210 does not exhibit the same degree of expansion or contraction as compared to the rake arm body 144.

Figure 7:
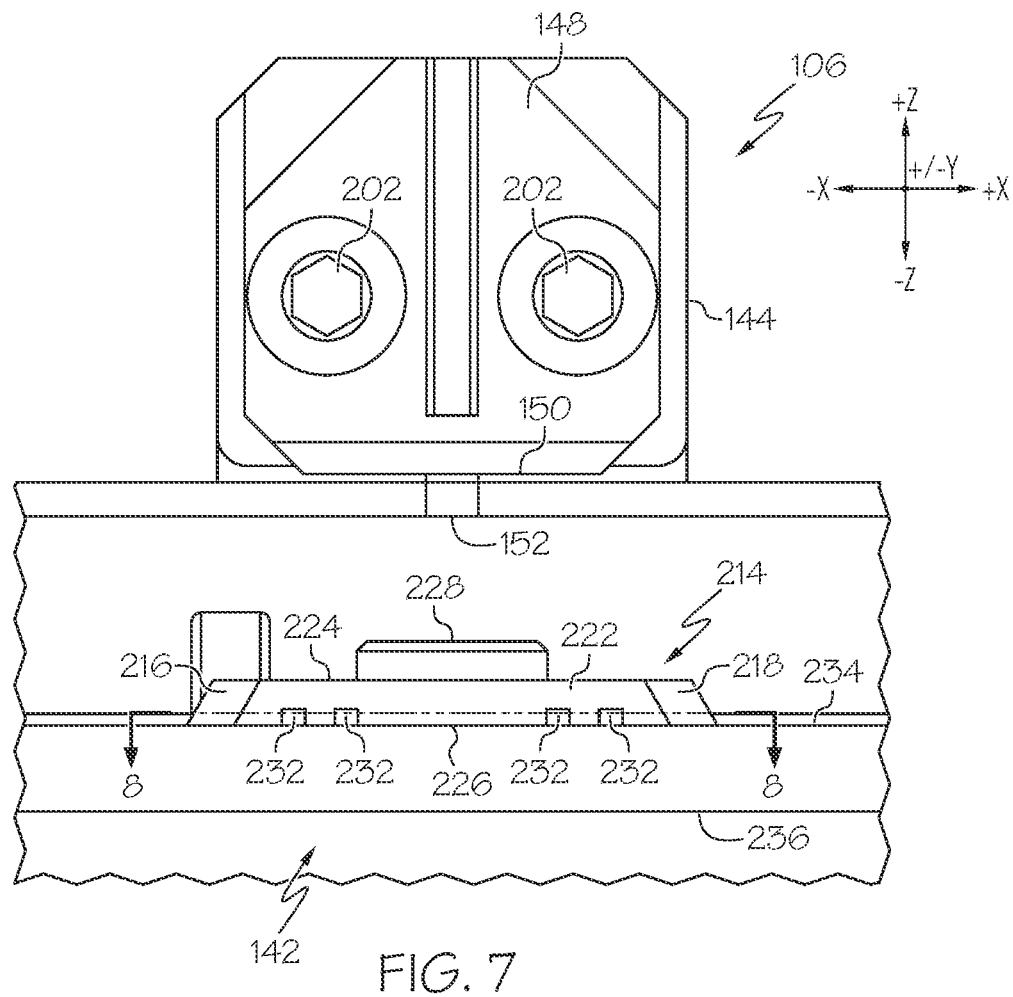
FIG. 7 schematically depicts a partial side view of the second guide rail of the rake arm assembly of FIG. 1 according to one or more embodiments shown and described herein.
Figure 8:
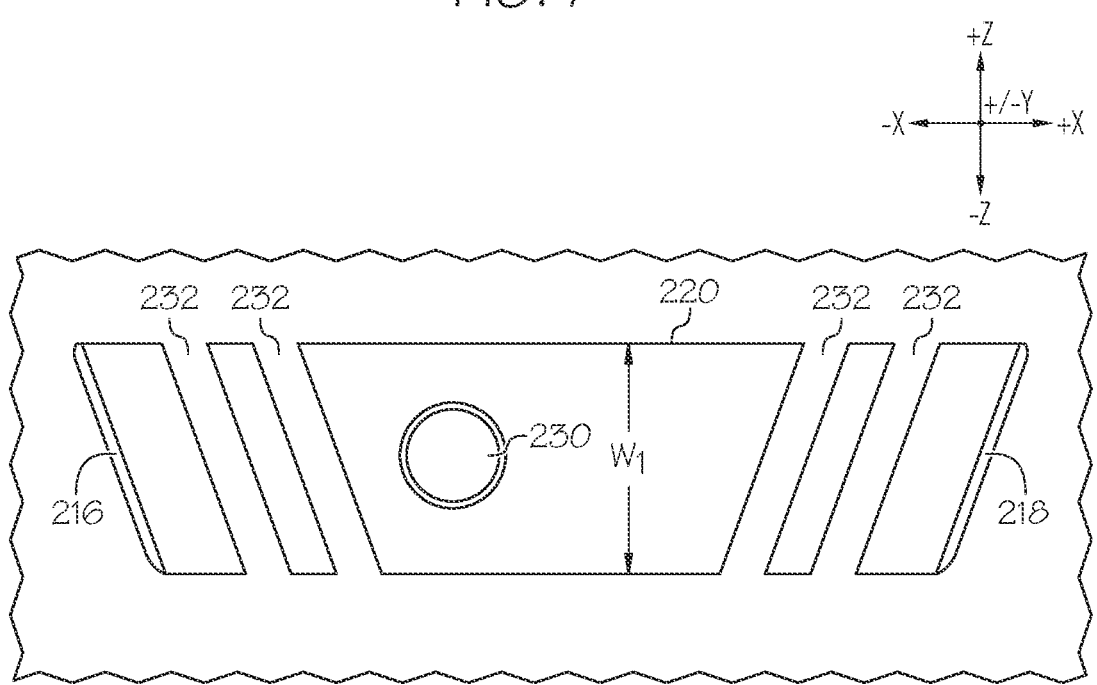
FIG. 8 schematically depicts a cross-sectional view of a guide pad of the rake arm assembly of FIG. 1 taken along line 8-8 of FIG. 7 according to one or more embodiments shown and described herein.

The second flange 210 has a lower surface 212 facing a direction opposite the build table 102. A guide pad 214 having a width $W_1$ is fixed to the lower surface 212 of the second flange 210 for reducing the amount of friction between the second rake support member 158 and the second guide rail 142 as the rake arm 106 moves along the working axis 108, as discussed in more detail herein. As shown in FIGS. 7 and 8, the guide pad 214 is shown having a first end 216, an opposite second end 218, a first side 220, an opposite second side 222, an upper surface 224, and an opposite lower surface 226. The guide pad 214 may be formed of any suitable material to reduce friction such as, for example, polytetrafluoroethylene (PTFE).

As shown in FIG. 7, the guide pad 214 may include a protrusion 228 extending from the upper surface 224 to engage a recess, not shown, formed within the lower surface 212 of the second flange 210. Engagement of the protrusion 228 within the recess prevents relative movement along the +/−Y axes and the +/−X axes of the coordinate axes depicted in the drawings. Further, a hole 230 may be formed to extend through the guide pad 214, through the protrusion 228, for receiving a fastener, not shown, to further secure the guide pad 214 to the second flange 210.

Referring again to FIGS. 7 and 8, in embodiments, each of the first end 216, the second end 218, the first side 220, and the second side 222 of the guide pad 214 taper inwardly from the lower surface 226 of the guide pad 214 toward the upper surface 224 thereof. This allows for powder accumulating on the second guide rail 142 to be deflected away from the guide pad 214, and thus off the second guide rail 142, as the rake arm 106 moves along the working axis 108. It should be appreciated that in embodiments, fewer than each of the first end 216, the second end 218, the first side 220, and the second side 222 of the guide pad 214 may be tapered. For example, in embodiments, only the first end 216 and the second end 218 are tapered from the lower surface 212 toward the upper surface 224. In addition, in embodiments, the first side 220 of the guide pad 214 may have a length greater than the second side 222 of the guide pad 214. As a result, the first end 216 and the second end 218 are also tapered in a direction from the first side 220 of the guide pad 214 toward the second side 222, i.e., in the −Y direction of the coordinate axes depicted in the drawings. It should be appreciated that tapering the first side 220 and the second side 222 of the guide pad 214 away from the rake arm body 144 directs powder accumulating on the second guide rail 142 away from the build table 102 to prevent powder from remaining on the second guide rail 142 and hindering movement of the rake arm 106. In embodiments, the guide pad 214 also includes one or more slots 232 formed in the lower surface 226 thereof. As shown in FIG. 8, the slots 232 are tapered inwardly toward a center of the guide pad 214 as the slots 232 extend in a direction toward the second side 222 of the guide pad 214, i.e., in the −Y direction. As shown, the guide pad 214 has four slots 232 formed therein. A first pair of slots 232 are formed proximate the first end 216 of the guide pad 214 and parallel to one another, as well as parallel to the first end 216 of the guide pad 214. A second pair of slots 232 are formed proximate the second end 218 of the guide pad 214 and parallel to one another, as well as parallel to the second end 218 of the guide pad 214. In use, the slots 232 define passageways for powder accumulated on the second guide rail 142 to be deflected off the second guide rail 142 and away from the rake arm 106.

Referring again to FIG. 6, the second guide rail 142 is shown mounted to the lower surface 112 of the build table 102 within the second channel 128. The second guide rail 142 extends along the +/−X axes of the coordinate axes depicted in the drawings and, thus, parallel to the first guide rail 140. The second guide rail 142 has an upper surface 234 and an opposite lower surface 236. As shown, a fastener 238 extends through the second guide rail 142 to secure the second guide rail 142 to the lower surface 112 of the build table 102 and within the second channel 128. However, as shown in FIG. 2, a plurality of fasteners 238 are provided to secure the second guide rail 142 to the lower surface 112 of the build table 102. The second rake support member 158 and the second guide rail 142 are positioned such that the guide pad 214 is positioned on the second guide rail 142. Specifically, the lower surface 226 of the guide pad 214 is positioned on a flat contact portion 240 of the upper surface 234 of the second guide rail 142, the contact portion 240 having a width $W_2$. As discussed herein, the build table 102 functions to shield the second flange 210 from heat caused by the electron beams fusing the powder. Similarly, the build table 102 shields the second guide rail 142 from temperature fluctuations as well occurring at the upper surface 110 of the build table 102 to reduce the likelihood the expansion and contraction of the second guide rail 142.

In use, referring to FIG. 1, the drive assembly 138 is operated to rotate the pair of pinions 160 and cause the drive chain 164 to move in either the first direction or the second direction. As the drive chain 164 is moved in one of the directions, the first rake support member 156, which is coupled to the mounting device 166 of the drive assembly 138, is translated along the rail member 168 of the first guide rail 140. Translation of the first rake support member 156 along the rail member 168 causes the rake arm body 144 to translate along the working axis 108 and across the build table 102, and more specifically the build envelope 132, to spread powder over both the build table 102 and the build envelope 132 and provide a flat surface on the powder.

Referring again to FIG. 6, the second rake support member 158 is caused to translate across the second guide rail 142 as the rake arm body 144 translates along the working axis 108. More particularly, the guide pad 214 translates along the contact portion 240 of the upper surface 234 of the second guide rail 142 to reduce the amount of friction between the second rake support member 158 and the second guide rail 142. It should be appreciated that the second rake support member 158 supports the second end 148 of the rake arm body 144 to maintain the rake arm body 144 in a parallel orientation relative to the upper surface 110 of the build table 102 as the rake arm 106 moves along the working axis 108. Further, the second rake support member 158 is free to move in the +/−Y directions as the rake arm body 144 expands due to increase heat from the electron beams and fusing of particles within the build envelope 132, and contracts once the rake arm body 144 is cooled. For example, as the rake arm body 144 expands and the second end 148 of the rake arm body 144 moves in the −Y direction, the guide pad 214 also moves in the −Y direction within the second channel 128 of the build table 102, but maintains its position on the second guide rail 142 due to the width $W_1$ of the guide pad 214 being less than the width $W_2$ of the contact portion 240 of the second guide rail 142. Similarly, as the rake arm body 144 contracts and the second end 148 of the rake arm body 144 moves in the +Y direction, the guide pad 214 also moves in the +Y direction and across the contact portion 240 of the upper surface 234 of the second guide rail 142. Thus, permitting the rake arm body 144 to expand in the −Y direction and permit the second rake support member 158 to move in the −Y direction as well, bowing of the rake arm body 144 is prevented and the rake arm body 144 maintains its parallel orientation with the build table 102.

Figure 9:
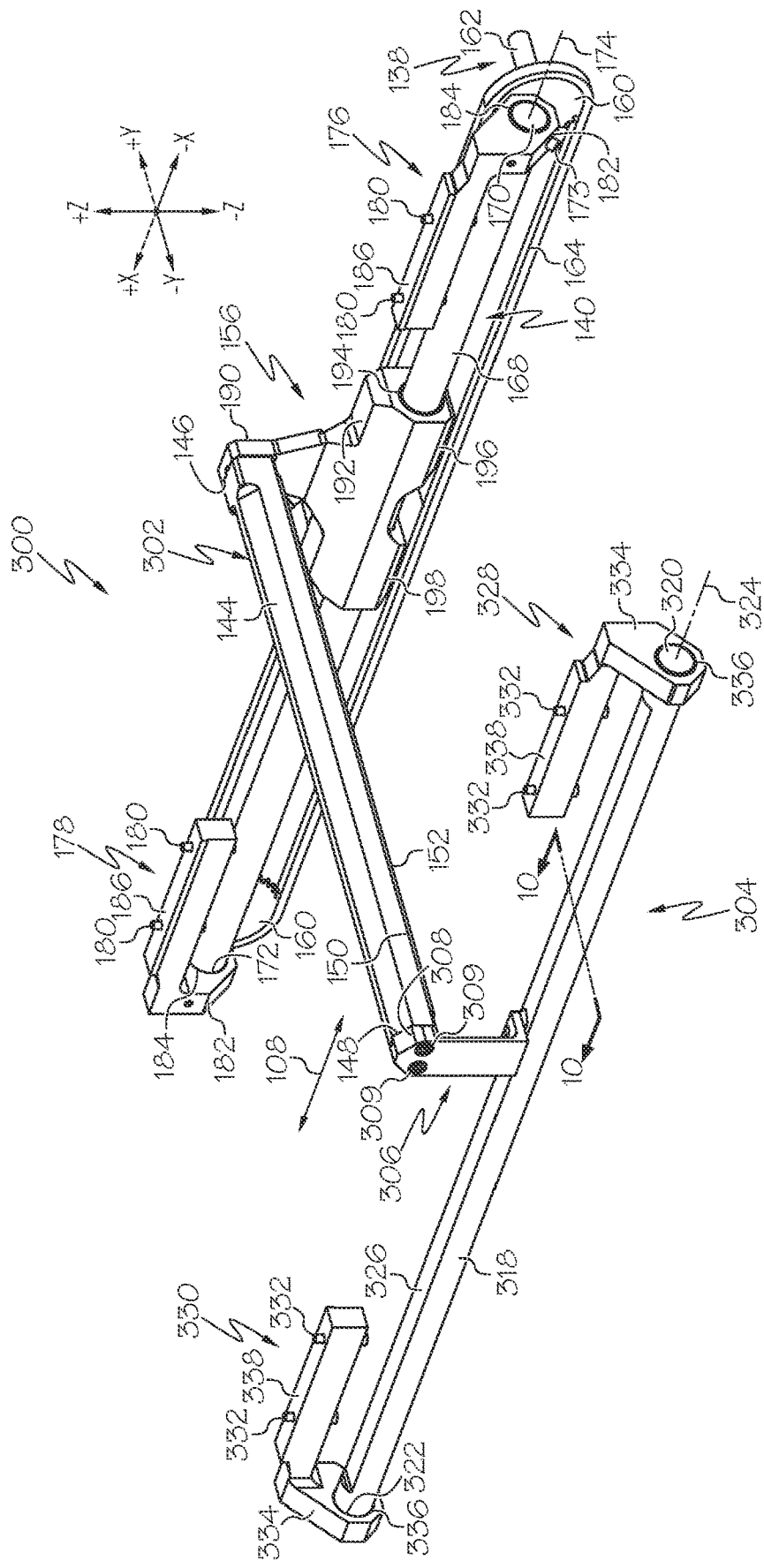
FIG. 9 schematically depicts a perspective view of an embodiment of another rake arm assembly according to one or more embodiments shown and described herein.

Referring now to FIG. 9, another embodiment of a rake arm assembly 300 is illustrated. It should be appreciated that the rake arm assembly 300 is similar to the rake arm assembly 104 discussed herein and, thus, similar reference numerals will be used to refer to like parts. However, the rake arm assembly 300 includes a rake arm 302, a second guide rail 304, and a second rake support member 306, as opposed to the rake arm 106, the second guide rail 142, and the second rake support member 158, respectively, of the rake arm assembly 104 discussed herein.

Figure 10:
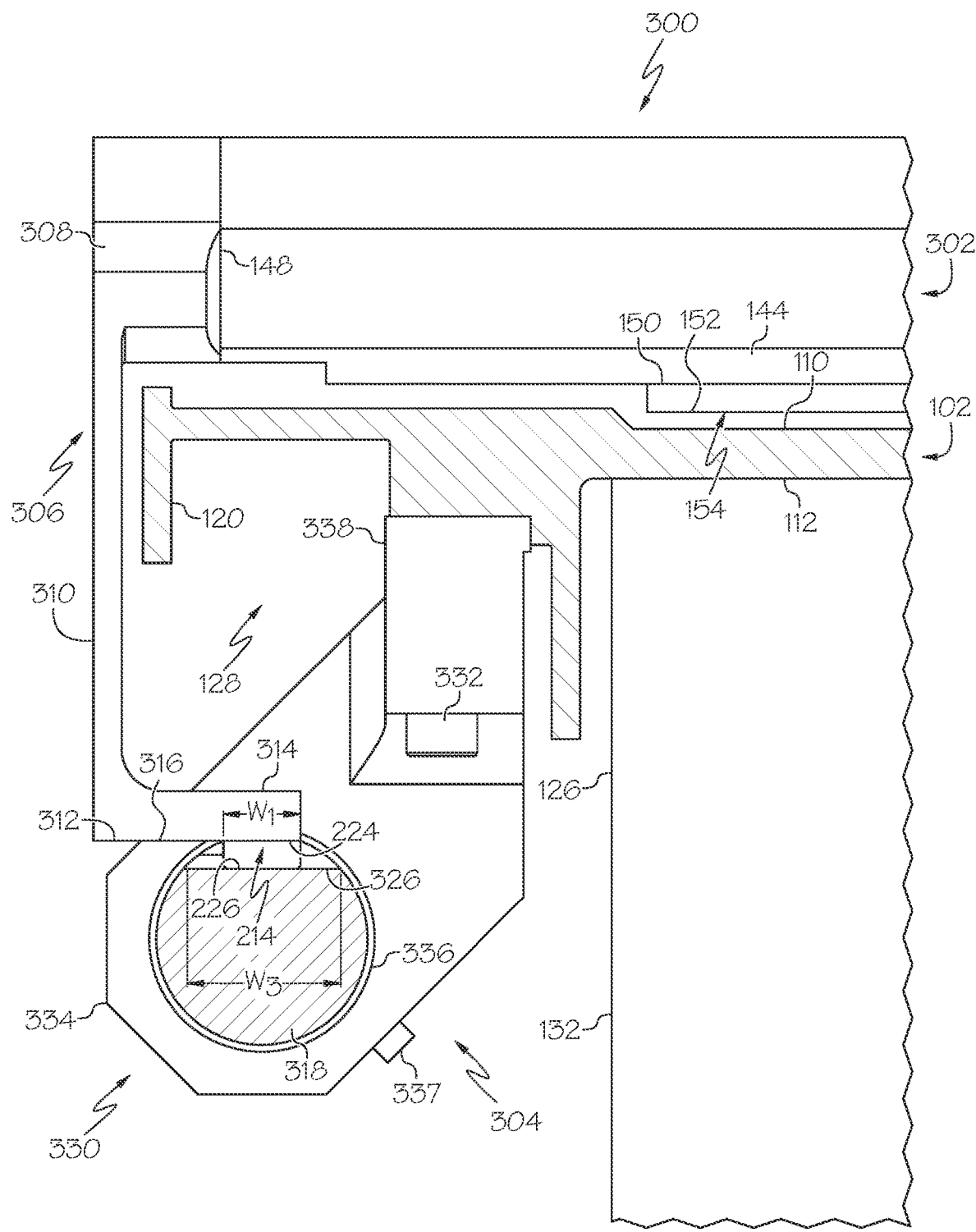
FIG. 10 schematically depicts a partial cross-sectional view of the rake arm assembly of FIG. 9 taken along the line 10-10 of FIG. 9 mounted to a build table according to one or more embodiments shown and described herein.

Referring to FIGS. 9 and 10, the second rake support member 306 includes a coupling member 308 coupled to the second end 148 of the rake arm body 144 by one or more fasteners 309, and a first flange 310 extending from the coupling member 308 and terminating at a distal end 312 opposite the second end 148 of the rake arm body 144. The distal end 312 of the first flange 310 is located below the rake arm body 144. The second rake support member 306 further includes a second flange 314 extending from the distal end 312 of the first flange 310 and in the +Y direction of the coordinate axes depicted in the drawings. The first flange 310 and the second flange 314 cooperate to form an L-shape geometry. As shown in FIG. 10 with the rake arm 302 positioned on the build table 102, the second flange 314 is positioned below the second channel 128 of the build table 102, contrary to the second flange 210 of the second rake support member 158, which is positioned within the second channel 128. Nonetheless, it should be appreciated that, due to the location of the second flange 314 being below the build table 102, the second flange 314 is shielded from the high heat and temperature fluctuations caused by the electron beams fusing the powder. Thus, the second flange 314 does not exhibit the same expansion and contraction as does the rake arm body 144, which results in warping as discussed herein. In embodiments, the coupling member 308, the first flange 310, and the second flange 314 form a one piece, monolithic structure.

The second flange 314 has a lower surface 316 facing a direction opposite the build table 102. The guide pad 214, as discussed herein, is fixed to the lower surface 316 of the second flange 314 for reducing the amount of friction between the second rake support member 306 and the second guide rail 304 as the rake arm 302 moves along the working axis 108, as discussed in more detail herein.

Referring again to FIG. 9, the rake arm assembly 300 includes the second guide rail 304, which is similar to the first guide rail 140. Specifically, the second guide rail 304 includes a rail member 318 having a first end 320 and an opposite second end 322. The rail member 318 extends along a guide axis 324 parallel to the working axis 108 and the guide axis 174 of the rail member 168 of the first guide rail 140. As shown, the rail member 318 of the second guide rail 304 has a substantially cylindrical geometry with a flat upper surface 326 having a width $W_3$. The second guide rail 304 also includes a first mount 328 fixed to a first end 320 of the rail member 318 and a second mount 330 fixed to the second end 322 of the rail member 318. The first mount 328 and the second mount 330 each includes one or more fasteners 332 for attaching each of the first mount 328 and the second mount 330 to the lower surface 112 of the build table 102, as shown in FIG. 10. More particularly, the first mount 328 and the second mount 330 each includes an extension portion 334 having an opening 336 for receiving a respective one of the ends 320, 322 of the rail member 318, and an insertion portion 338 extending from the extension portion 334. The insertion portion 338 of the first mount 328 and the second mount 330 is insertable into the second channel 128 of the build table 102 and secured to the lower surface 112 of the build table 102 by the one or more fasteners 332. As shown in FIG. 9, a pair of fasteners 332 extend from each insertion portion 338 into the lower surface 112 of the build table 102.

Referring still to FIG. 9, the first end 320 of the rail member 318 extends through the opening 336 formed in a corresponding extension portion 334. In embodiments, as with the first guide rail 140 discussed herein, only one end 320, 322 of the rail member 318 is fixed to a corresponding extension portion 334 by any suitable manner, such as welding, using fasteners, or the like, to permit the rail member 318 to move (e.g., expand and/or contract) in the +/−X directions of the coordinate axes of FIG. 9 due to increases and/or decreases in temperature. As shown in FIG. 10, a fastener 337 extends through the extension portion 334 of the second mount 330 and secures the second end 322 of the rail member 318 within the opening 336 formed in the extension portion 334 of the second mount 330. However, the first end 320 of the rail member 318 is not secured and thus is free to move within the opening 336 formed in the extension portion 334 of the first mount 328. Alternatively, the first end 320 of the rail member 318 may be secured to the first mount 328 and the second end 322 of the rail member 318 may be free to move relative to the second mount 330. Further, the rail member 318 has a length defined by a distance between the first end 320 and the second end 322, which is substantially as long as the length of the build table 102 and a distance between the pair of pinions 160. This permits the rake arm body 144, specifically the second end 148 of the rake arm body 144, to be supported during translation of the rake arm body 144 across the entire build table 102. However, in embodiments, the length of the rail member 318 may be greater or less than that illustrated based on the size of the build table 102 and/or the size of the build envelope 132.

The rake arm assembly 300 operates in substantially the same manner as the rake arm assembly 104 discussed herein. Thus, it should be appreciated that, during translation of the rake arm 302 along the working axis 108, the guide pad 214 moves along the upper surface 326 of the rail member 318 of the second guide rail 304 to support the second end 148 of the rake arm body 144. Further, the guide pad 214 is freely movable on the upper surface 326 of the rail member 318. Thus, the guide pad 214 moves in the −Y direction across the rail member 318 as the rake arm body 144 expands, but maintains contact with the upper surface 326 of the rail member 318 due to the width $W_1$ of the guide pad 214 being less than the width $W_3$ of the upper surface 326 of the rail member 318.

From the above, it is to be appreciated that defined herein are additive manufacturing systems and rake arm assemblies for spreading metal powder across a build platform despite deformation caused by heat generated by electron beams fusing the metal powder. Particularly, the rake arm assemblies permit expansion and contraction due to the generated heat while maintaining the orientation of the rake arm assemblies across a build table.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses:

1. A rake arm assembly mountable to a build table having an upper surface and an opposite lower surface, the rake arm assembly comprising: a rake arm body having a first end and a second end, the rake arm body extending in a direction transverse to a working axis at an upper surface of the build table; a first guide rail mountable to the lower surface of the build table and extending along the working axis; a first rake support member fixed to the first end of the rake arm body and movably supported on the first guide rail; a second rake support member fixed to the second end of the rake arm body; and a guide pad fixed to a lower surface of the second rake support member and positionable at the lower surface of the build table.

2. The rake arm assembly of any preceding clause, wherein the second rake support member comprises: a first flange extending to a first vertical position below the rake arm body; and a second flange extending from the first flange to a second vertical position below the rake arm body, the second vertical position being between the rake arm body and the first vertical position, wherein the guide pad is fixed to a lower surface of the second flange opposite the rake arm body.

3. The rake arm assembly of any preceding clause, further comprising a second guide rail extending along the working axis, the guide pad positioned on an upper surface of the second guide rail.

4. The rake arm assembly of any preceding clause, wherein the second guide rail is positioned between the first vertical position and the second vertical position.

5. The rake arm assembly of any preceding clause, further comprising a second guide rail extending along the working axis, the guide pad positioned on an upper surface of the second guide rail, the upper surface of the second guide rail positioned on a side of the second rake support member opposite the rake arm body.

6. The rake arm assembly of any preceding clause, wherein the guide pad includes a front wall, a rear wall, a pair of side walls extending between the front wall and the rear wall, an upper surface, and a lower surface, the pair of side walls are tapered toward the upper surface.

7. The rake arm assembly of any preceding clause, wherein the guide pad includes at least one slot formed in the lower surface of the guide pad.

8. The rake arm assembly of any preceding clause, wherein: the first rake support member comprises a receiving member having a bore; a first guide rail extends through the bore of the receiving member; and a bushing is positioned within the bore of the receiving member and circumscribes a portion of the first guide rail extending through the bore.

9. The rake arm assembly of any preceding clause, further comprising a drive assembly coupled to the first rake support member for translating the first rake support member along the first guide rail along the working axis.

10. The rake arm assembly of any preceding clause, wherein the drive assembly comprises a pair of pinions and a drive chain engaging each of the pair of pinions.

11. An additive manufacturing system comprising: a build table having an upper surface and an opposite lower surface; and a rake arm assembly comprising: a rake arm body having a first end and a second end, the rake arm body extending in a direction transverse to a working axis and positioned at the upper surface of the build table; a first guide rail extending along the working axis and fixed to the lower surface of the build table; a first rake support member fixed to the first end of the rake arm body and movably supported on the first guide rail; a second guide rail extending along the working axis and fixed to the lower surface of the build table; a second rake support member fixed to the second end of the rake arm body; and a guide pad fixed to a lower surface of the second rake support member and movably supported on an upper surface of the second guide rail, the guide pad positioned at the lower surface of the build table opposite the rake arm body.

12. The additive manufacturing system of any preceding clause, wherein the second rake support member comprises: a first flange extending to a first vertical position below the rake arm body; and a second flange extending from the first flange to a second vertical position below the rake arm body, the second vertical position being between the rake arm body and the first vertical position.

13. The additive manufacturing system of any preceding clause, wherein the guide pad is fixed to a lower surface of the second flange opposite the rake arm body.
14. The additive manufacturing system of any preceding clause, wherein the second guide rail is positioned between the first vertical position and the second vertical position.
15. The additive manufacturing system of any preceding clause, wherein the second guide rail is positioned on a side of the second rake support member opposite the rake arm body.
16. The additive manufacturing system of any preceding clause, wherein the guide pad includes a front wall, a rear wall, a pair of side walls extending between the front wall and the rear wall, an upper surface, and a lower surface having at least one slot formed therein, the pair of side walls are tapered toward the upper surface.
17. The additive manufacturing system of any preceding clause, wherein the first rake support member comprises a receiving member having a bore, the first guide rail extends through the bore.
18. The additive manufacturing system of any preceding clause, further comprising a bushing positioned within the bore of the receiving member and circumscribing a portion of the first guide rail extending through the bore.
19. A rake arm assembly mountable to an additive manufacturing system having a build table having an upper surface and an opposite lower surface, the rake arm assembly comprising: a rake arm body having a first end and a second end, the rake arm body extending in a direction transverse to a working axis and positioned at the upper surface of the build table; a first rake support member fixed to the first end of the rake arm body; a second rake support member fixed to the second end of the rake arm body; a guide rail extending along the working axis and mountable to the lower surface of the build table; and a guide pad fixed to a lower surface of the second rake support member and movably supported on an upper surface of the guide rail, the guide pad positioned at a lower surface of the build table.
20. The rake arm assembly of any preceding clause, wherein the second rake support member comprises: a first flange extending to a first vertical position below the rake arm body; and a second flange extending from the first flange to a second vertical position below the rake arm body, the second vertical position being between the rake arm body and the first vertical position, the guide pad fixed to a lower surface of the second flange.
21. A method for translating a rake arm assembly across a build platform along a working axis, the rake arm assembly including a rake arm body interconnecting a first rake support member and a second rake support member, the method comprising: actuating a drive mechanism; and in response to actuating the drive mechanism, the first rake support member of the rake arm assembly translates along the working axis and across a first guide rail mounted to a lower surface of the build platform, and the second rake support member translates along the working axis and across a second guide rail mounted to the lower surface of the build platform, wherein a guide pad is positioned between the second rake support member and the second guide rail to reduce friction between the second rake support member and the second guide rail during translation.
22. The method of any preceding clause, wherein the second rake support member comprises: a first flange extending to a first vertical position below the rake arm body; and a second flange extending from the first flange to a second vertical position below the rake arm body, the second vertical position being between the rake arm body and the first vertical position, wherein the second flange is received within a channel formed in the build platform and traverses the channel as the rake arm assembly moves along the working axis.

What is claimed is:
1. A rake arm assembly mountable to a build table, the rake arm assembly comprising:
　a rake arm body having a first end and a second end, the rake arm body extending in a direction transverse to a working axis at an upper surface of the build table;
　a first guide rail mountable to a lower surface of the build table and extending along the working axis;
　a first rake support member fixed to the first end of the rake arm body and movably supported on the first guide rail;
　a second rake support member fixed to the second end of the rake arm body, the second rake support member comprising:
　　a first flange extending from the second end of the rake arm body to a first vertical position below the rake arm body; and
　　a second flange extending from the first flange to a second vertical position below the rake arm body, the second vertical position being between the rake arm body and the first vertical position; and
　a guide pad fixed to a lower surface of the second flange of the second rake support member opposite the rake arm body and positionable at the lower surface of the build table, the guide pad including a front wall, a rear wall, a pair of side walls extending between the front wall and the rear wall, an upper surface, a lower surface, and at least one slot formed in the lower surface of the guide pad, the pair of side walls are tapered toward the upper surface of the guide pad.
2. The rake arm assembly of claim 1, further comprising a second guide rail extending along the working axis, the guide pad positioned on an upper surface of the second guide rail.
3. The rake arm assembly of claim 2, wherein the second guide rail is positioned between the first vertical position and the second vertical position.
4. The rake arm assembly of claim 1, further comprising a second guide rail extending along the working axis, the guide pad positioned on an upper surface of the second guide rail, the upper surface of the second guide rail positioned on a side of the second rake support member opposite the rake arm body.
5. The rake arm assembly of claim 1, wherein:
　the first rake support member comprises a receiving member having a bore;
　the first guide rail extends through the bore of the receiving member; and
　a bushing is positioned within the bore of the receiving member and circumscribes a portion of the first guide rail extending through the bore.
6. The rake arm assembly of claim 5, further comprising a drive assembly coupled to the first rake support member for translating the first rake support member along the first guide rail along the working axis.

7. The rake arm assembly of claim 6, wherein the drive assembly comprises a pair of pinions and a drive chain engaging each of the pair of pinions.

8. An additive manufacturing system comprising:
a build table having an upper surface and an opposite lower surface; and
a rake arm assembly comprising:
a rake arm body having a first end and a second end, the rake arm body extending in a direction transverse to a working axis and positioned at the upper surface of the build table;
a first guide rail extending along the working axis and fixed to the lower surface of the build table;
a first rake support member fixed to the first end of the rake arm body and movably supported on the first guide rail;
a second guide rail extending along the working axis and fixed to the lower surface of the build table;
a second rake support member fixed to the second end of the rake arm body, the second rake support member comprising:
a first flange extending from the second end of the rake arm body to a first vertical position below the rake arm body; and
a second flange extending from the first flange to a second vertical position below the rake arm body, the second vertical position being between the rake arm body and the first vertical position; and
a guide pad fixed to a lower surface of the second flange of the second rake support member opposite the rake arm body and movably supported on an upper surface of the second guide rail, the guide pad positioned at the lower surface of the build table opposite the rake arm body, the guide pad including a front wall, a rear wall, a pair of side walls extending between the front wall and the rear wall, an upper surface, and a lower surface having at least one slot formed therein, the pair of side walls are tapered toward the upper surface of the guide pad.

9. The additive manufacturing system of claim 8, wherein the second guide rail is positioned between the first vertical position and the second vertical position.

10. The additive manufacturing system of claim 8, wherein the second guide rail is positioned on a side of the second rake support member opposite the rake arm body.

11. The additive manufacturing system of claim 8, wherein the first rake support member comprises a receiving member having a bore, the first guide rail extends through the bore.

12. The additive manufacturing system of claim 11, further comprising a bushing positioned within the bore of the receiving member and circumscribing a portion of the first guide rail extending through the bore.

13. A rake arm assembly mountable to an additive manufacturing system having a build table, the rake arm assembly comprising:
a rake arm body having a first end and a second end, the rake arm body extending in a direction transverse to a working axis and positioned at an upper surface of the build table;
a first rake support member fixed to the first end of the rake arm body;
a second rake support member fixed to the second end of the rake arm body, the second rake support member comprising:
a first flange extending from the second end of the rake arm body to a first vertical position below the rake arm body; and
a second flange extending from the first flange to a second vertical position below the rake arm body, the second vertical position being between the rake arm body and the first vertical position;
a guide rail extending along the working axis and mountable to a lower surface of the build table; and
a guide pad fixed to a lower surface of the second flange of the second rake support member opposite the rake arm body and movably supported on an upper surface of the guide rail, the guide pad positioned at the lower surface of the build table, the guide pad including a front wall, a rear wall, a pair of side walls extending between the front wall and the rear wall, an upper surface, and a lower surface having at least one slot formed therein, the pair of side walls are tapered toward the upper surface of the guide pad.

* * * * *